Figure 1:
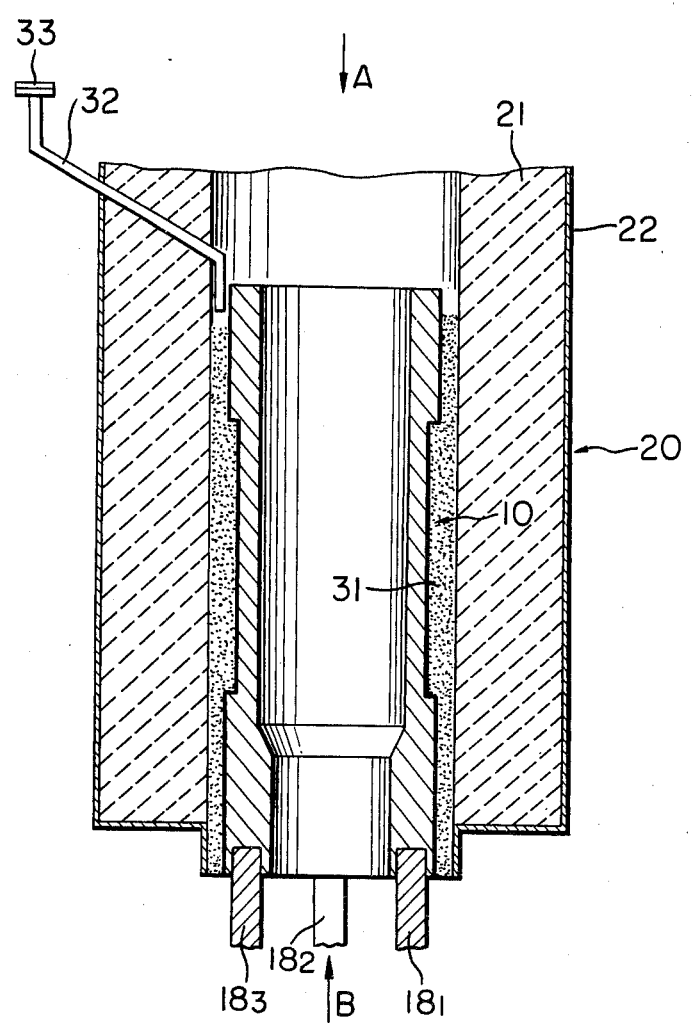

United States Patent [19]
Ishizuka et al.

[11] 4,158,695
[45] Jun. 19, 1979

[54] ELECTROTHERMAL FLUIDIZED BED FURNACE

[75] Inventors: Hiroshi Ishizuka, 19-2 Ebara 6-chome, Shinagawa-ku, Tokyo, Japan; Yoshiaki Sugano, Hadano, Japan

[73] Assignee: Hiroshi Ishizuka, Tokyo, Japan

[21] Appl. No.: 811,392

[22] Filed: Jun. 29, 1977

[30] Foreign Application Priority Data
Jul. 1, 1976 [JP] Japan .................. 51-77011
Jul. 1, 1976 [JP] Japan .................. 51-77012

[51] Int. Cl.$^2$ .............. B01J 8/24; H05B 3/62; H05B 3/66
[52] U.S. Cl. ..................... 422/145; 13/25; 422/146; 422/240; 422/241
[58] Field of Search .......... 23/284, 277 R, 252 A; 13/20, 22, 25; 422/139, 145, 146, 240, 241

[56] References Cited
U.S. PATENT DOCUMENTS

| | | | |
|---|---|---|---|
| 2,681,943 | 6/1954 | Hartwick | 23/277 R X |
| 2,788,260 | 4/1957 | Rick | 23/277 R X |
| 2,946,668 | 7/1960 | Richelsen | 23/277 R |
| 2,998,469 | 8/1961 | Vatterodt | 13/22 |
| 3,057,936 | 10/1962 | Hill | 13/20 X |
| 3,058,817 | 10/1962 | Irani | 23/284 |
| 3,124,425 | 3/1964 | Richelsen | 23/277 R |
| 3,147,331 | 9/1964 | Brugger | 23/277 R X |
| 3,155,759 | 11/1964 | Marshall | 13/20 X |
| 4,049,385 | 9/1977 | Bohnenstingl et al. | 23/277 R |
| 4,057,396 | 11/1977 | Matovich | 23/277 R X |

Primary Examiner—Joseph Scovronek
Attorney, Agent, or Firm—Frank J. Jordan

[57] ABSTRACT

Electrothermal fluidized bed furnace useful particularly for chlorination of oxide of zirconium and the like utilizes graphite reactor tube longitudinally divided into a plurality of separate sectors by a corresponding number of longitudinal slits which are filled with insulating and refractory material. The reactor tube sectors are physically and electrically united at one end of the tube so that one or more pairs of opposite sectors are electroresistively heated while the intervening opposite sectors are left electrothermally unactivated for preventing short circuits which would otherwise result due to carbon fed together with the oxide. Owing to such electrothermal system, the furnace wall can be fluid-tightly sealed with use of metallic material for preventing harmful chlorine gas from leaking. Owing to such construction, the life of the graphite tube can be prolonged.

13 Claims, 6 Drawing Figures

ELECTROTHERMAL FLUIDIZED BED FURNACE

The present invention relates to an electrothermal fluidized bed furnace, and more particularly to such a furnace of the resistance heating type.

The so-called electrothermal fluidized bed furnaces have been used in various fields which involve the zirconium, titanium, niobium, vanadium and the like metal industry. It is important for obtaining high purity of such metal to efficiently proceed with chlorination of the corresponding oxide.

Heretofore this endothermic reaction has been carried out by passing electric current through the descending stock of powder oxide and carbon in the conventional shaft-type furnace. However, such moving stock complicates the maintenance of heating electrodes and of proper electrical characteristics to provide the desired uniform heating of the charge.

Thus, it has recently been proposed and actually carried out to utilize the fluidized bed method.

Generally pulverized oxide, for instance, of zirconium and carbon, are fed from the top into the reactor tube while chlorine and any inert gas as the carrier are fed from the bottom into the reactor tube to provide the fluidized bed. The pulverized materials may be fed also from the bottom together with the gas flow. When heating the tube, the following reactions occur at a temperature of roughly about 1,000° C.;

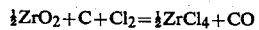

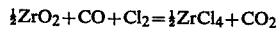

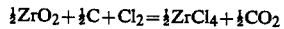

The necessary heating is carried out according to one conventional method by arranging one electrode submerged in the formed bed material and utilizing the reactor wall as the second electrode by passing high voltage electric current therebetween with the aid of suspended carbon. This is not satisfactory however, in that the desired uniform heating cannot be expected. According to the other conventional method there is arranged electrical windings around the reactor tube so as to pass alternating current for electromagnetic induction heating. This is satisfactory from the viewpoint of uniform heating but disadvantageous in that metallic material cannot be used for the furnace wall since it is inevitably to be in the alternating magnetic field and to have an adverse effect on the efficiency of the electromagnetic induction heating in the reactor tube so that complete sealing of the furnace is difficult which results in various defects including leakage of harmful chlorine gas.

One of the objects of the present invention is, thus, to provide an improved electrothermal fluidized bed furnace for various purposes, preferably, but not exclusively, for chlorination of the oxides of zirconium, titanium, niobium, vanadium and the like metal while avoiding and overcoming the defects referred to above by virtue of providing an electroresistively heated reactor tube.

Another object of the invention is to provide such furnace in which there is substantially no electric short circuit due to carbon suspended in the resistance heating reactor tube.

A further object is to provide such furnace in which the fluidized bed is kept in stable condition.

Figure 2:
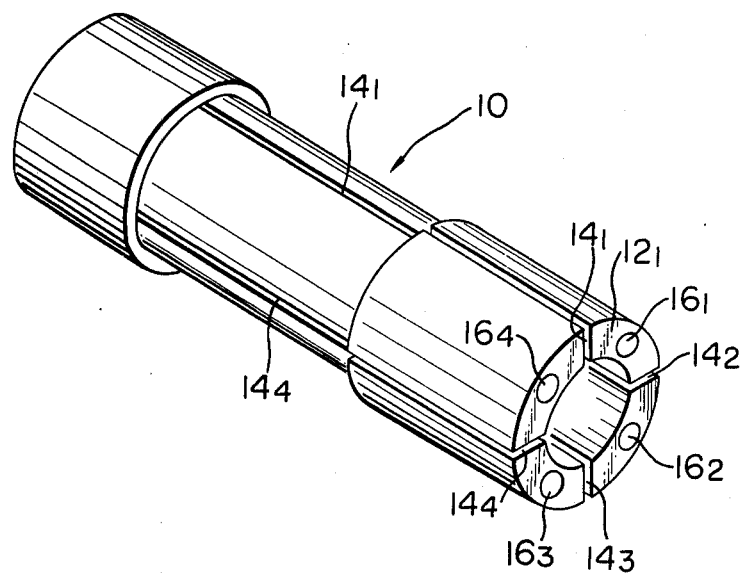
Figure 3:
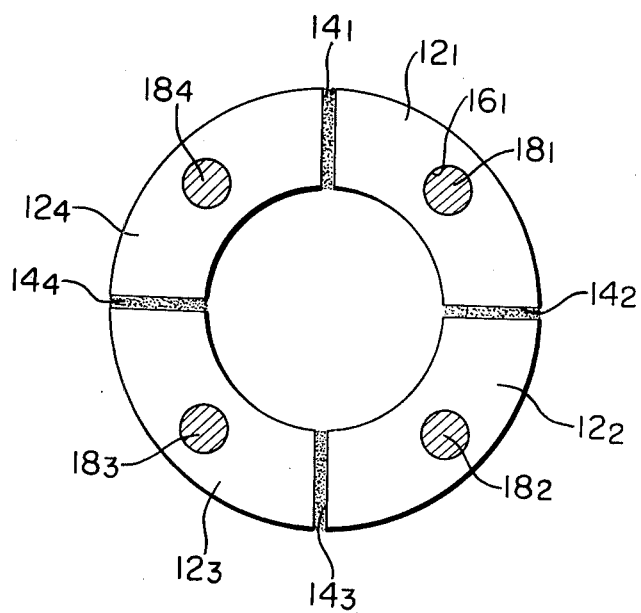
Figure 4:
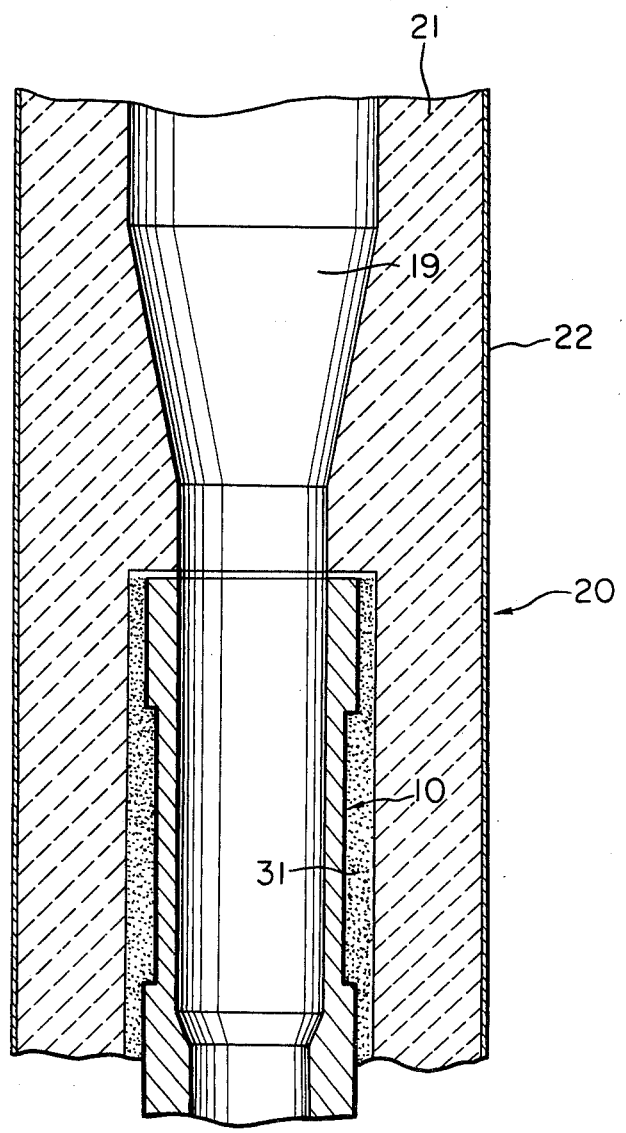
Figure 5:
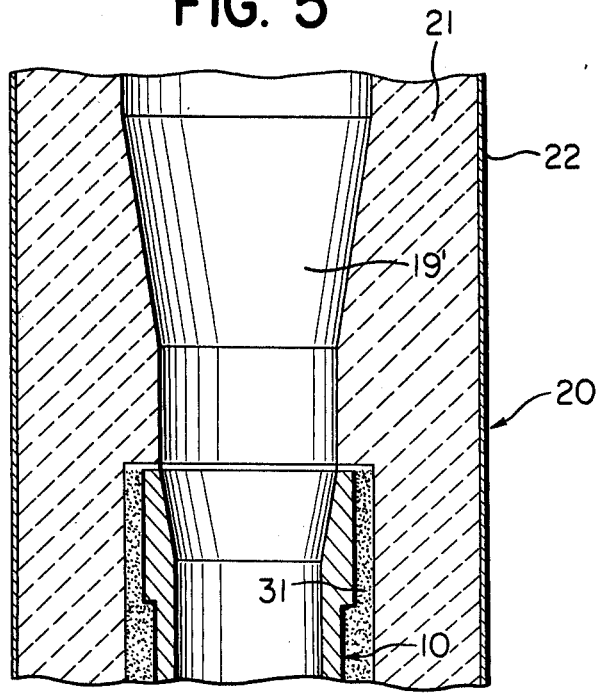
Figure 6:
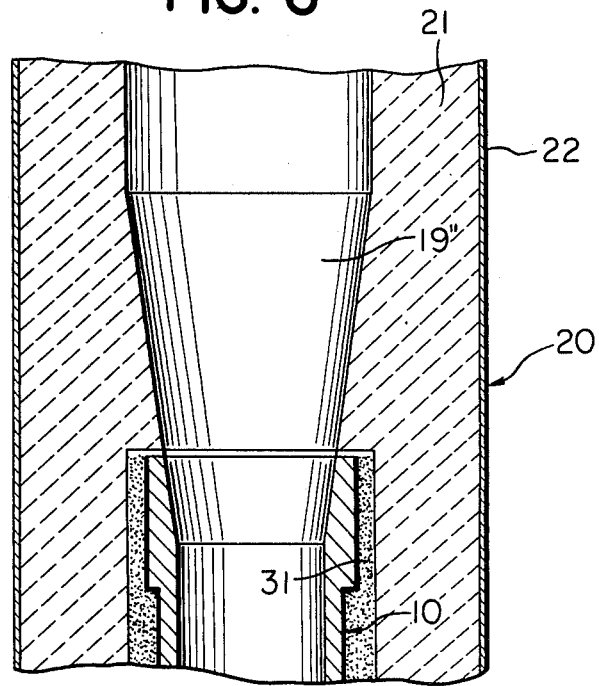

Other objects and advantages of the invention will be readily appreciated by studying the following explanation of a preferred embodiment with reference to the accompanying drawings; in which:

FIG. 1 is a fragmentary longitudinal sectional view of an electrothermal fluidized bed furnace according to the invention, FIG. 2 is a perspective view of the electroresistive reactor tube, FIG. 3 is a view showing the bottom end of the reactor tube, FIG. 4 is a view similar to FIG. 1 but with an upper funnel arranged added on the top of the reactor tube, FIGS. 5 and 6 show modified embodiments of the funnel of FIG. 4.

In FIG. 1 a substantially cylindrical reactor made of any electrically resistive material such as graphite is represented generally by the numeral 10, and the reactor is surrounded by a thick furnace wall represented generally by 20. The wall 20 is made of any insulating refractory 21 such as alumina bricks and a metallic outer wall 22 surrounds the refractory in order to completely fluid-tightly seal the furnace. The full explanation of the reactor tube 10 shall be made hereafter with reference to FIGS. 2 and 3, but FIG. 1 shows only three electrodes $18_1$, $18_2$, and $18_3$ of the four at the bottom of the reactor tube 10.

Into the annular gap formed between the outer peripheral surface of the reactor tube 10 and the inner peripheral surface of the furnace wall 20, the oxide to be chlorinated, for instance zirconium 31, is preferably fed as will be explained hereinafter, and may be fed through a duct 32 from an inlet 33.

Now with reference to FIGS. 2 and 3, the reactor tube 10 is preferably made of relatively thick wall lower and upper portions and a relatively thin wall middle portion so that the thin portion is heated particularly at a high temperature, due to its higher resistance, necessary for heating the fluidized bed materials, for instance pulverized zirconium oxide and chlorine gas which are reacted at the concerned level in the reactor tube 10. The tube is longitudinally divided into four elongated sectors $12_1$, $12_2$, $12_3$ and $12_4$ by four elongated slits $14_1$, $14_2$, $14_3$ and $14_4$ each extending along the lower thick wall portion and middle thin wall portion so that the longitudinally separated four sectors are physically and electrically united together at the upper thick portion. The sectors respectively have grooves $16_1$, $16_2$, $16_3$ and $16_4$ at the lower end thereof for fitting electrodes $18_1$, $18_2$, $18_3$ and $18_4$ respectively therein. Each slit is filled with any suitable electrically insulating and refractory material such as pulverized quartz cement as shown in FIG. 3.

When passing electric current through the oppositely arranged sectors $12_1$ and $12_3$, the other pair of sectors $12_2$ and $12_4$ are kept electrically neutral so as to avoid any short circuit due to carbon particles fluidizedly suspended in the reactor tube 10 owing to gas flow. As well known, the resistive material such as graphite of the reactor tube is deteriorated during the operation.

Changing over from one pair of exhausted resistive sectors to the other pair or alternate activation of the two pairs of resistive sectors will prolong the life of the reactor tube. The tube 10 may be divided not only into four parts as illustrated but also into eight parts so as to activate two pairs of opposedly arranged electrodes and sectors while the other two pairs each intermediate between the electrically activated adjacent two may be kept neutral. Division into six sectors is theoretically possible, but practically not desirable in view of effective and uniform heating. Division into more than eight would not be desired because too narrow a width of the sector will not prevent a short circuit. When three-phase electric current is used for resistance heating, however, the tube 10 is to be divided into six or nine or twelve parts.

Due to the electric current passage, the high temperature and collision of flowing of hard material such as zirconium oxide, the reactor tube made of graphite and the like inevitably deteriorates so that it must be replaced with a new one. Thus there is inevitably formed a space or gap between the outer peripheral wall of the tube and the inner peripheral surface of the furnace wall. On the other hand chlorine gas may leak out of the reactor tube, above all in such a reactor tube having slits according to the invention, into the annular space gap. Although the slits are filled with a refractory material, this is not so useful for complete sealing. This leakage not only has an adverse affect on the stability of the fluidized bed but also reacts with the refractory material and further, which the outermost metal of the furnace wall. When the space or gap is filled with zirconium oxide, the leakage may be suppressed more or less and any little amount of chlorine gas having leaked out of the reactor tube is reacted with the oxide to prevent further diffusion.

As is well known to those skilled in the art, when the feed of the mixture of chlorine and carrier gas such as carbon oxide is too much in relation to the mixture of carbon and zirconium oxide, the fluidized bed level ascends. According to the reactor tube as shown in FIG. 1, such fluidized bed level should be kept in the zone surrounded by the middle thin wall portion. When the level ascends above the zone the temperature is naturally lowered which can be detected so as to control the gas flow.

However, when the level eventually further ascends so that the fluidized bed level is beyond the upper end of the reactor tube, due to the step formed between the reactor tube inner surface and the furnace wall inner surface break up of the fluidized bed results. In this case it is necessary to stop the feed of materials and reform the fluidized bed firstly by feeding the carrier gas and carbon only and then supplying gradually increased amounts of the reactants. It might be useful for avoiding the loss of materials and time due to such fluidized bed break up caused by the stall thereof to make the height of the reactor tube sufficiently elongated, but this necessitates excessive graphite of the reactor tube which is apt to deteriorate in a fairly short time and excessive electric energy would be applied thereto for heating.

It has been found very effective for avoiding such stall of the fluidized bed to form a funnel above the reactor tube as illustrated by 19 in FIG. 4, 19' in FIG. 5 and 19" in FIG. 6. The funnel can be simply formed by correspondingly laying the relevantly shaped refractory bricks. This funnel 19, 19' or 19" is useful not only for preventing eventual collapse of the stable fluidized bed but also for eliminating leakage of the gas through the deteriorated filler in the slits of the reactor tube 10.

The result of using the fluidized bed furnace according to the invention for chlorination of zirconium oxide shall be explained. The reactor tube was made of graphite having the dimensions of 150 cm height total including 90 cm middle thin wall portion, 32 cm inner diameter and 50 cm largest outer diameter. This reactor tube 10 longitudinally divided into four sectors by four slits which were filled with pulverized quartz and was mounted in the furnace wall of 60 cm inner diameter. The annular gap therebetween was filled with zirconium oxide. When passing electric current of from 1,000 to 700 amperes and from 5 to 7 volts across the oppositely arranged electrodes $18_1$ and $18_3$ the temperature in the reactor tube 10 at the middle thin wall portion was raised to 800°–900° C. Usually a mixture of carbon oxide and carbon monoxide as the carrier gas was fed from the bottom and carbon was fed from the top to form a stable fluidized bed at the desired level. Then gradually increased amounts of zirconium oxide and chlorine gas were added to that chlorine gas flow from the bottom was 400 l/m and the mixture of zirconium oxide and carbon in the ratio of 6–9:1 from the top was 90 kg/hr. The resulting zirconium tetrachloride in the gas state at the raised temperature as referred to above was collected in the amount of 150 kg/hr from the top of the reactor tube. The fluidized bed was quite stable in comparison with the conventional fluidized bed furnaces. The operation was continued for 30 days, in the midst of which supply of the electric power was changed from the opposite electrodes to the other pair of electrodes in view of deterioration of the first used graphite sectors.

The present invention has been explained in respect of chlorinating zirconium oxide, but it should be noted that the electrothermal fluidized bed furnace of the invention can be used for various fluidized bed process where the reaction is of endothermic nature.

What is claimed is:

1. In an electrothermal fluidized bed furnace comprising a substantially cylindrical and upright inner furnace wall made of insulating refractory bricks, a fluid-tightly sealing outer furnace wall made of a metallic material and arranged around said inner furnace wall, a reactor tube mounted inside said inner furnace wall, means for receiving raw materials charged into said reactor tube through an upper open end thereof, means for receiving gases introduced into said reactor tube through a lower end thereof to form within said reactor tube a fluidized bed for the raw materials, and electrodes for supplying power to said reactor tube to heat the raw materials in the fluidized bed and cause therein a reaction thereof with the gases, the improvement in that said reactor tube is made of graphite and has a plurality of slits extending longitudinally from the lower end towards the upper end of said reactor tube so that a lower portion of the reactor tube is divided into a plurality of pairs or triplets of elongated parts each having a sector cross section, each of said slits being filled with an insulating refractory material, each of said elongated parts being provided with the electrode, and means for supplying power to at least one selected pair or triplet of said elongated parts through the corresponding electrodes to pass electric current and heat the selected elongated parts which are separated from each other by at least one intervening elongated part in which the corresponding electrode passes no electrical current.

2. The electrothermal fluidized bed furnace as claimed in claim 1 in which each of said elongated parts have a free lower end, said electrodes extending into said free lower ends.

3. The electrothermal fluidized bed furnace as claimed in claim 1 in which said slits terminate short of the upper longitudinal end of said reactor tube.

4. The electrothermal fluidized bed furnace as claimed in claim 1 in which said reactor tube consists of end portions each having a wall thickness greater than the wall thickness of the middle portion between said end portions so that when electrical current is passed to the electrodes in the reactor tube, said middle portion is heated higher than both end portions, said slits extending into one of said end portions and said middle portion.

5. The electrothermal fluidized bed furnace as claimed in claim 1, in which there is provided a funnel means on the inner furnace wall, said reactor tube being detachably mounted on the inside of the furnace wall and having an upper end thereof connected to a lower open end of the funnel means.

6. The electrothermal fluidized bed furnace as claimed in claim 5 in which the funnel means comprises a conical portion disposed above a cylindrical portion, said conical portion having its smallest diameter coinciding with the upper end of said cylindrical portion, said cylindrical portion having its lower end connected to the upper end of the reactor tube.

7. The electrothermal fluidized bed furnace as claimed in claim 6 in which said reactor tube has an upper inner wall portion having a conical configuration.

8. The electrothermal fluidized bed furnace as claimed in claim 7 in which said conical configured upper inner wall portion of said reactor tube has its larger diameter equal to the diameter of said cylindrical portion of said funnel means.

9. The electrothermal fluidized bed furnace as claimed in claim 5 in which the funnel means comprises a conical portion, said reactor tube having an upper inner wall portion having a conical configuration which forms a continuation of said conical portion of said funnel means.

10. The electrothermal fluidized bed furnace as claimed in claim 6 in which said conical portion of said funnel means converges towards the reactor tube.

11. The electrothermal fluidized bed furnace as claimed in claim 7 in which said conical configured upper wall portion of said reactor tube converges downwardly.

12. The electrothermal fluidized bed furnace as claimed in claim 1 comprising means defining an annular gap between the reactor tube and an inner furnace wall, said furnace being operable to chlorinate raw materials comprising oxide of metals selected from the group consisting of zirconium, titanium, niobium, and vanadium, said annular gap being filled with the same metal oxide as that selected for the raw materials so that any reactant gas which leaks from the fluidized bed in the reactor tube through the filled slits reacts with said oxide filled in the annular gap to form gaseous products identical to that formed in the fluidized bed.

13. In an electrothermal fluidized bed furnace comprising a susbstantially cylindrical and upright inner furnace wall made of insulating refractory bricks, a fluid-tightly sealing outer furnace wall made of a metallic material and arranged around said inner furnace wall, a reactor tube mounted inside said inner furnace wall, means for receiving raw materials charged into said reactor tube through an upper open end thereof, means for receiving gases introduced into said reactor tube through a lower end thereof to form within said reactor tube a fluidized bed for the raw materials, and electrodes for supplying power to said reactor tube to heat the raw materials in the fluidized bed and cause therein a reaction thereof with the gases, the improvement in that said reactor tube is made of graphite and has a plurality of slits extending longitudinally from the lower end towards the upper end of said reactor tube so that the lower portion of the reactor tube is divided into a plurality of pairs or triplets of elongated parts each having a sector cross section, each of said slits being filled with an insulating refractory material, each of said elongated parts being provided with the electrode, means for supplying power to at least one selected pair of triplet of said elongated parts through the corresponding electrodes to pass electric current and heat the selected elongated parts which are separated from each other by at least one intervening elongated part in which the corresponding electrode passes no electrical current, and an annular gap between said reactor tube and the inner furnace wall filled with an oxide of a metal selected from the group consisting of zirconium, titanium, niobium and vanadium, so that any reactant gas which leaks from the fluidized bed in the reactor tube through the filled slits reacts with said oxide filled in the annular gap to form gaseous products identical to that formed in the fluidized bed.

* * * * *